June 23, 1970     R. LUESCHER     3,516,342
ROLL-TYPE MAGAZINE FOR PHOTOGRAPHIC PRINTING PAPER
TO BE USED IN AUTOMATIC COPIERS Filed Nov. 27, 1967     4 Sheets-Sheet 1

INVENTOR.
René Luescher
BY
Pierce, Scheffler & Parker
Attorneys

INVENTOR.
Rene' Luescher

United States Patent Office 3,516,342
Patented June 23, 1970

3,516,342
ROLL-TYPE MAGAZINE FOR PHOTOGRAPHIC PRINTING PAPER TO BE USED IN AUTOMATIC COPIERS
René Luescher, Regensdorf, Zurich, Switzerland, assignor to Ciba Limited, Basel, Switzerland, a company of Switzerland
Filed Nov. 27, 1967, Ser. No. 685,915
Claims priority, application Switzerland, Dec. 14, 1966, 17,827/66
Int. Cl. G03b *19/04;* B65h *75/18*
U.S. Cl. 95—31                                    5 Claims

ABSTRACT OF THE DISCLOSURE

A magazine for rolls of photographic paper comprising a cylindrical housing closed at each end by an end wall. Each end wall has a hub rotatably mounted thereon and each hub has a flange which can be located in a number of positions on the hub. The two end walls are releasably fixed to the cylinder so that the hubs extend towards each other along the axis of the cylinder.

---

This invention relates to magazines particularly magazines for rolls of photographic printing paper.

For loading photographic enlargers with rolls of light-sensitized paper and for rewinding the paper after exposure, roll type magazines are employed which contain the photographic printing paper in the form of a roll in a light-tight receptacle, and which are thus suitable for daylight loading and unloading of the enlarger. But unloading of the roll type magazine with rolls of printing paper is very complicated, especially when paper rolls have different width.

One object of the present invention is the provision of a roll-type magazine for rolls of photographic printing paper to be used particularly in automatic photographic enlargers.

According to the invention there is provided a magazine particularly for rolls of photographic printing paper, said magazine including a housing defined by a cylindrical surface and two end surfaces closing the cylinder at each end thereof, the improvement comprising a first tubular hub rotatably mounted on one end surface, a second tubular hub rotatably mounted on the other end surface, first and second flange members, first and second locating elements releasably positioning said first and second flange members on said first and second hubs respectively and means releasably fixing said end surfaces to said cylinder whereby said first and second hubs extend towards each other along the axis of said cylinder.

A roll-type magazine constructed in the manner proposed by the present invention has the advantage of being insertable into the photographic enlarger for use as a winding-off or winding-on magazine for left hand or right hand rolls and of also being suitable for the reception of paper rolls of different widths, the magazines being adjustable to the different widths by appropriately locating the guide flanges.

Specific embodiments of the invention will now be described by way of example with reference to the accompanying drawings in which.

Figure 1:
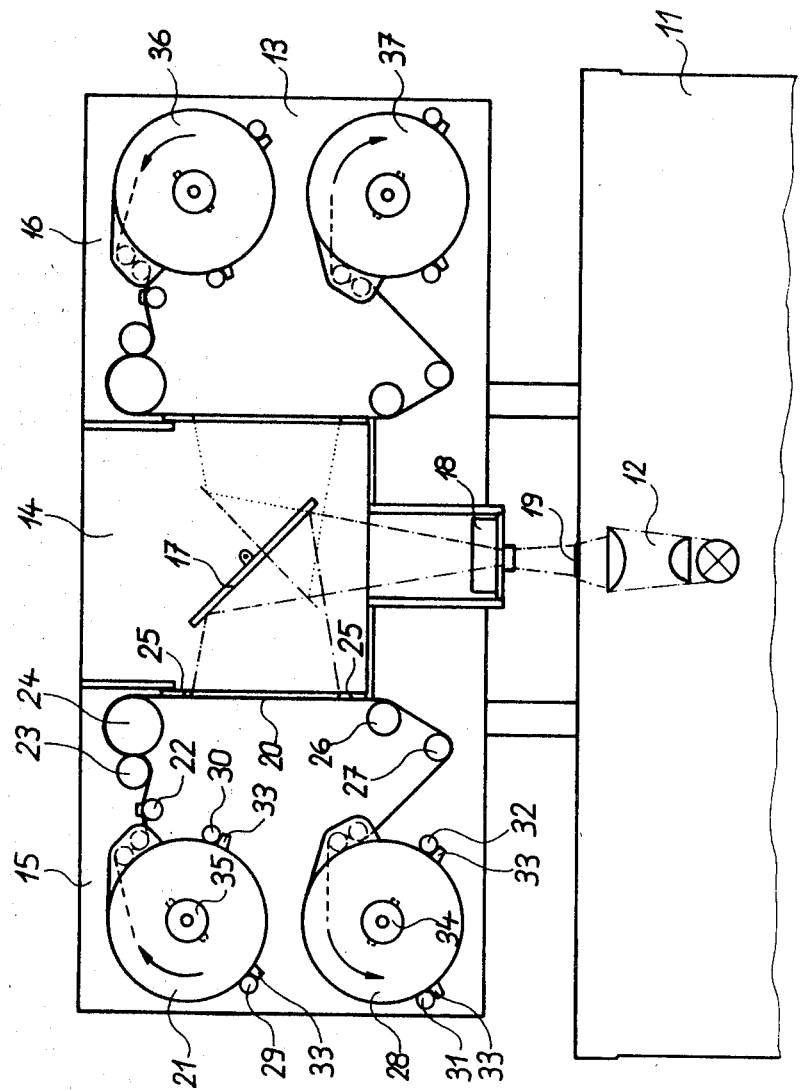
FIG. 1 is a general schematic view of a photographic enlarger equipped for two independent supply systems of printing paper.

The photographic enlarger in FIG. 1 comprises a base 11 containing an illuminating optical system 12 and an upper portion 13 comprising a compartment 14 for optical equipment, a paper compartment 15 and a paper compartment 16. The optical compartment 14 contains a pivoted mirror 17 below which is an objective 18 which projects the image of a photographic negative 19 by transmitted light onto the surface 20 of a reel of printing paper. The printing paper is unwound from a roll in an upper roll-type magazine, drawn over a paper table 22, led between the hip of roller 23 and feed roller 24 and thence across the opening of a mask 25 which frames the area that is to be exposed. The exposed printing paper is then conducted over a guide roller 26 and a tensioning roller 27 and wound up in roll form in a lower roll-type magazine 28. The two magazines 21 and 28 each contain a left hand roll. Each magazine is mounted on two carrier arms 29, 30 and 31, 32 respectively and prevented from rotating by bosses 33 projecting from the magazine shells. The paper 20 is fed by a motor, not shown, which rotates winding core 34 in the bottom magazine 28 as well as the paper feed. Winding core 35 in the upper magazine may be braked to prevent the paper from unwinding spontaneously.

The paper compartment 16 is equipped in a similar fashion to the above-described paper compartment 15. Thus, compartment 16 contains two identical roll-type magazines 36, 37 which are located mirror symmetrically to the magazines in compartment 15, and therefore contain right hand rolls.

Figure 2:
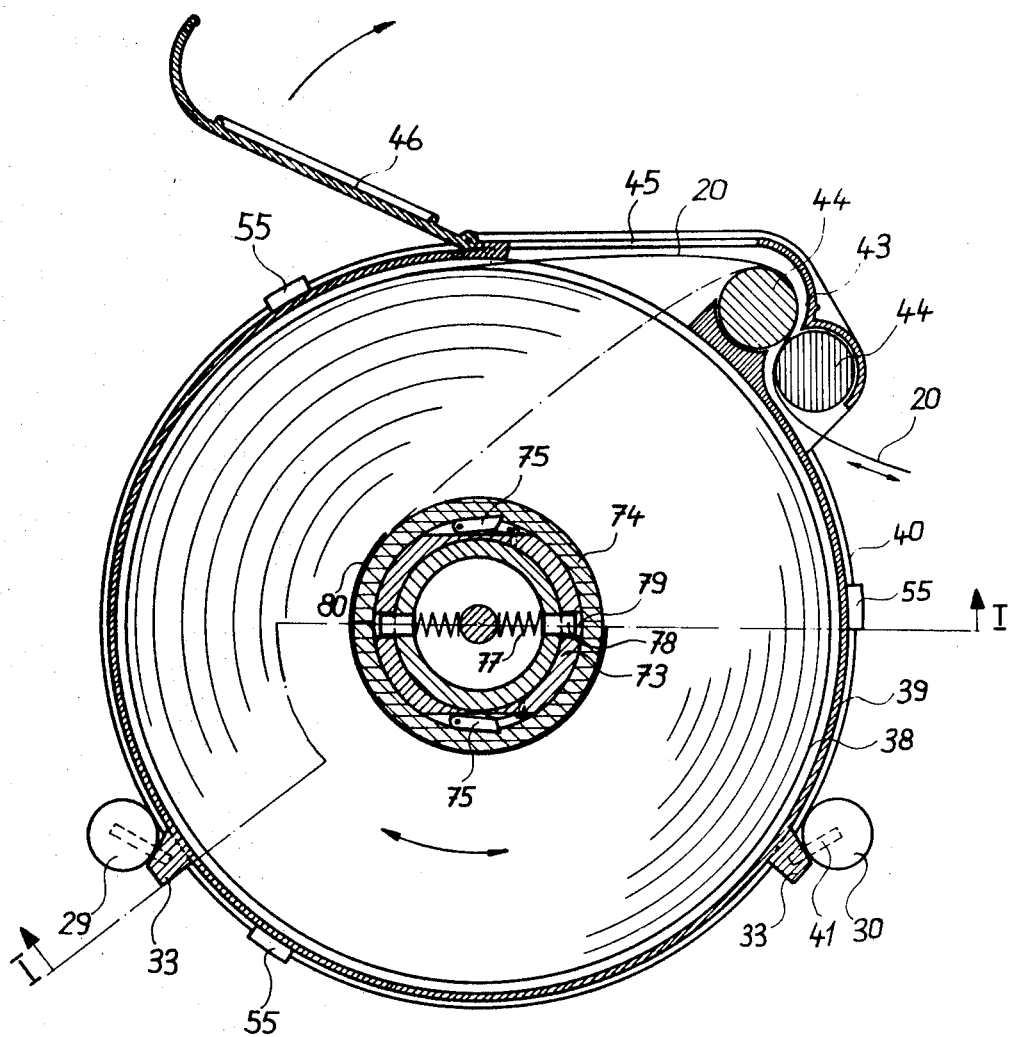
FIG. 2 is a roll-type magazine according to the invention, shown in cross-section.
Figure 3:
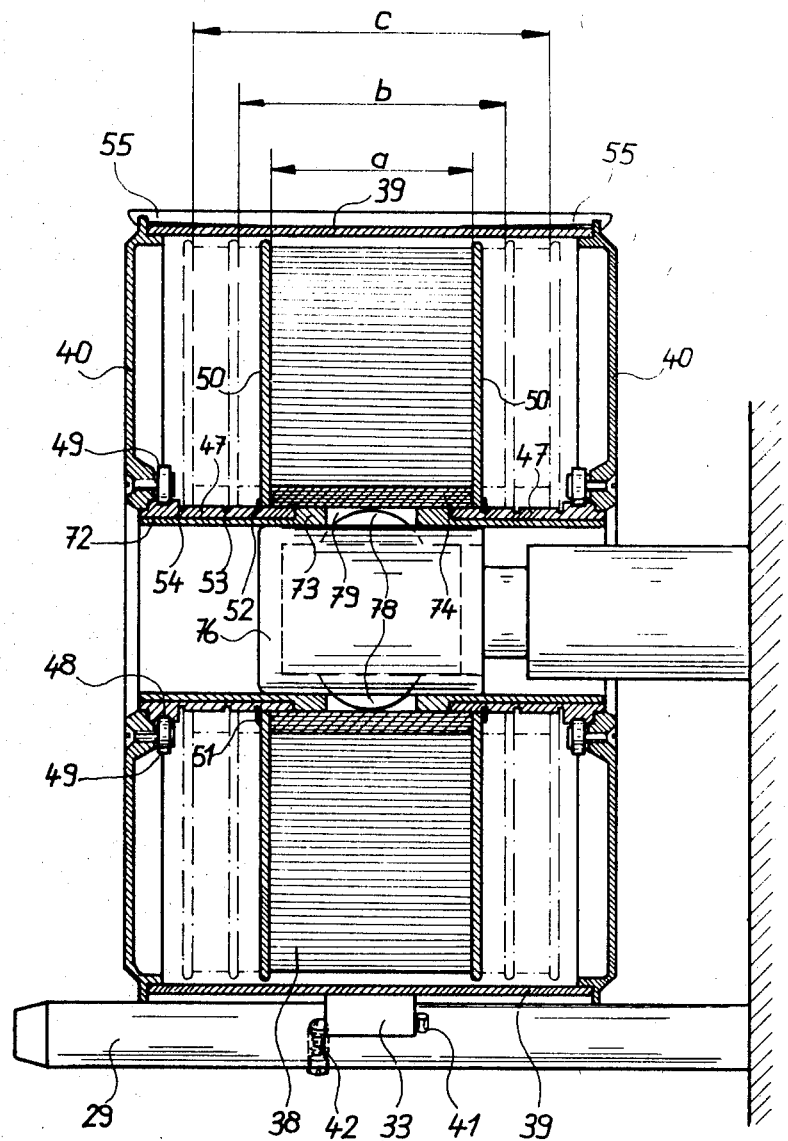
FIG. 3 is an axial section of the magazine, taken on the line I—I in FIG. 2, and, FIGS. 4 and 5 illustrate guide flanges fitted with different types of locating means.

The roll-type magazine shown in cross section in FIG. 2 and in an axial section in FIG. 3 contains a roll of paper 38 inside a cylindrical housing 39 having two identical end walls 40. Like the magazine 21 shown in FIG. 1, the housing 39 of the magazine shown in FIGS. 2 and 3 rests on two carrier arms 29, 30 and the housing 39 has two bosses 33 which are retained by the carrier arms and thereby prevent the magazine from rotating. The bosses 33 are held between a stop 41 and a spring-loaded ball 42 on the carrier arms 29 and 30 respectively to locate the magazine such that paper fed therefrom will pass through the optical centre plane of the enlarger. The housing 39 is fitted with a light trap 43 comprising two rollers 44 between which the printing paper 20 is drawn out, and a window 45 which can be closed by a hinged cover 46 for loading the magazine with the roll of printing paper. Externally the housing 39 is provided with three spring clips 55 which hold the two end walls 40 in place.

The two end walls 40 each rotatably carry a tubular hub 47 which contains a track groove 48 for co-operation with a plurality of small rollers 49 mounted on the end walls and adapted to roll in the track groove 48 when the tubular hub 47 rotates. Each of the tubular hubs 47 carries a guide flange 50 on each side of the width of the paper roll 38. The guide flange 50 is held in position by a releasable locating element 51 engaging a groove 52. Several locating grooves 53, 54 are provided side by side spaced apart relationship on the periphery of the hub. More particularly, the locating grooves 52 relatively space the guide flanges 50 an appropriate distance $a$ apart to contain a paper roll 3" wide between them, whereas the locating grooves 53 provide a distance $b$ for a roll 3½" wide and the locating grooves 54 a distance $c$ for a roll 5" wide. The end wall 40 together with the tubular hub 47 and the guide flange 50 form an assembly which, by raising the clips 55, can be removed for replacing the paper roll and then reinserted. Since the construction of the two end walls 40 of the two tubular hubs 47 and of the two guide flanges 50 on each side is identical, the centre of any paper roll, irrespective of its width $a$, $b$ or $c$, will necessarily be correctly centred with respect to that paper led from the magazine will pass through the optical centre plane of the enlarger.

Figure 4:
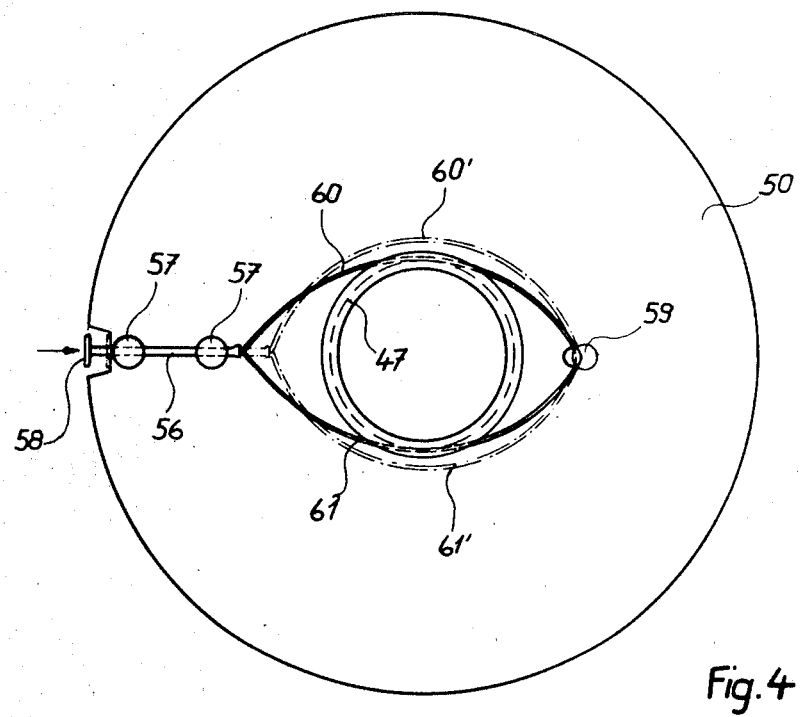

Preferably the releasable locating elements 51 comprise spring-loaded catches attached to an actuating member radially slidably fitted to the guide flange and provided with a member at the peripheral edge of the flange in such manner that radial displacement of the member moves the catches radially outwards, releasing them from engagement with the locating groove. In an embodiment illustrated in FIG. 4 an actuating member 56 is radially slidable in guide means 57 on the guide flange 50 and likewise carries a member 58 at the periphery of the flange. Attached to this actuating member is a spring wire loop which bears against a stop 59 on the opposite side of the tubular hub. The two arcuate halves 60 and 61 of the loop are urged by their inherent spring force into the locating groove in the tubular hub 47, but they are outwardly expandable into the positions 60' and 61' and thereby disengageable from the groove when thrust is applied to the member 58.

Figure 5:
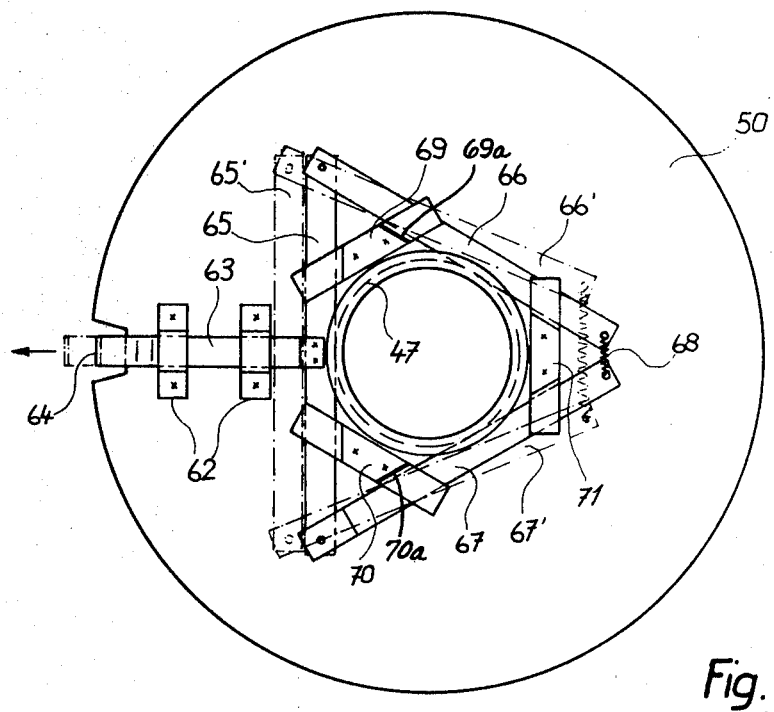

In another embodiment illustrated in FIG. 5 an actuating member which is radially slidable in guide means 62 on the side of the guide flange 50 and provided with a member 64 at the peripheral edge of the flange is connected to three bars 65, 66, 67 linked to form a triangle embracing the hub, the first bar 65 being attached to the actuating member 63 at right angles thereto, whereas the second and third bars 66, 67 are pivotably attached to the ends of the transverse bar 65. The other ends of the second and third bars 66, 67 are urged together by a tension spring 68 until all three bars engage a locating groove in the tubular hub 47. Moreover, the bars are held against the guide flange 50 by guide members 69, 70, 71. When the member 64 is pulled radially outwards the bar 65 is directly forced out of engagement with the locating groove into the position 65'. When the inner edges of second and third bars 66, 67 contact the fixed guide planes 69a, 70a there results a torque in the second and third bars 66 and 67 and therefore the latter are forced out of the groove into the positions 66', 67'.

The two tubular hubs 47 upon which the end walls 40 are mounted are pushed over opposite ends of a tubular core 72. This tubular core includes a collar 73 in the centre, which just fills the space between the inner ends of the two tubular hubs 47. The collar carries the cardboard tube 74 on which the roll of paper 48 is wound. The collar 73 also carries two spring loaded pawls 75 acting in opposite directions. When the cardboard tube is axially pushed on the collar the pawls prevent independent rotation of the cardboard tube with respect to the collar. When the roll type magazine has been horizontally mounted on the carrier arm 29, the free end of a shaft 76 projects into the tubular hub. In order to couple the tubular hub with shaft 76, the shaft is fitted with slidable arresting segments 78 attached to springs 77 for engaging co-operating recesses 79 in the tubular hub.

In order to load a magazine with a roll one end wall is removed and the roll on its cardboard tube is pushed onto the hub. When the hinged cover 46 is open the end of the roll of paper can be easily pushed through the light trap 43. For rewinding the roll the end wall is removed and the leading end pushed from the outside through the light trap and secured by means of a spring clip 80 to an empty cardboard tube 74. The roll is then wound on by rotation of the shaft 76. The end wall which had been removed can be easily and conveniently secured by pushing the tubular hub 47 onto the tubular core 72 and clipping the edge of the disc under the spring clips 55.

What is claimed is:

1. In a magazine particularly for rolls of photographic printing paper, said magazine including a housing defined by a cylinder and two end walls closing said cylinder at each end thereof, the improvement comprising a first tubular hub, rotatably mounted on one end wall, a second tubular hub, rotatably mounted on the other end wall, first and second flange members, first and second locating elements releasably positioning said first and second flange members on said first and second hubs, respectively, means releasably fixing said end walls to said cylinder, said first and second hubs extending towards each other along the axis of said cylinder, and each end wall together with its adjoining hub and flange member forming a unit fastenable on said cylinder.

2. In a magazine particularly for rolls of photographic printing paper, said magazine including a housing defined by a cylinder and two end walls closing said cylinder at each end thereof, the improvement comprising a first tubular hub, rotatably mounted on one end wall, a second tubular hub, rotatably mounted on the other end wall, first and second flange members, first and second locating elements releasably positioning said first and second flange members on said first and second hubs, respectively, means releasably fixing said end walls to said cylinder, said first and second hubs extending towards each other along the axis of said cylinder, the hubs being concentrically mounted on a core, a collar being provided in the middle of the core for the reception of a roll of photographic printing paper, said collar including means for preventing a roll of paper received thereon from rotating with respect to said collar and means for coupling said hubs with a shaft.

3. In a magazine particularly for rolls of photographic printing paper, said magazine including a housing defined by a cylinder and two end walls closing said cylinder at each end thereof, the improvement comprising a first tubular hub, rotatably mounted on one end wall, a second tubular hub, rotatably mounted on the other end wall, first and second flange members, first and second locating elements releasably positioning said first and second flange members on said first and second hubs, respectively, means releasably fixing said end walls to said cylinder, said first and second hubs extending towards each other along the axis of said cylinder, the hubs being concentrically mounted on a core, a collar benig provided in the middle of the core for the reception of a roll of photographic printing paper, said collar including means for preventing a roll of paper received thereon from rotating with respect to said collar, means for coupling said hubs with a shaft, each hub comprising a plurality of circumferential grooves for locating said associated flange member, each locating element including spring means adapted to urge it into engagement with one of said grooves, and actuator means being provided for said locating elements, each actuator means being radially movable with respect to its associated flange member and linked to its associated locating element whereby radial displacement of said actuator will urge its associated locating element out of engagement with its associated groove.

4. The magazine of claim 3, wherein each locating element comprises a first bar coupled to said actuator means, a second bar having one end pivotally coupled to one end of said first bar, a third bar having one end pivotally coupled to the other end of said first bar, tension spring means coupling the other ends of said second and third bars, and guide members engageable with said second and third bars whereby radial displacement of said actuator means away from its associated hub will cause said second and third bars to spread one away from the other because of the torque, that results when the inner edges of said second and third bars contact the fixed guide members.

5. The magazine of claim 3, wherein each locating element comprises two arcuate spring members coupled together to form a loop, said actuator means being attached to said loop abutment means engageable with said loop at a position substantially opposite the point of attachment of said actuator means, whereby radial displacement of said actuator means towards its associated hub will increase the dimension of said loop in a direction at right angles to the direction of displacement of said actuator means.

References Cited

UNITED STATES PATENTS

| | | | |
|---|---|---|---|
| 2,017,636 | 10/1935 | Smalley | 242—71.9 |
| 2,115,912 | 5/1938 | Helmond | 242—71.9 XR |
| 2,729,401 | 1/1956 | Italiano | 242—71.1 |
| 3,256,794 | 6/1966 | Schutt | 95—31 |
| 3,354,777 | 11/1967 | Normandy | 335—50 XR |

NORTON ANSHER, Primary Examiner

D. S. STALLARD, Assistant Examiner

U.S. Cl. X.R.

242—71.9